US010039120B2

(12) United States Patent
Montojo et al.

(10) Patent No.: US 10,039,120 B2
(45) Date of Patent: Jul. 31, 2018

(54) SCALING OF SHARED SPECTRUM EXCLUSIVE RESOURCES

(71) Applicant: QUALCOMM Incorporated, San Diego, CA (US)

(72) Inventors: Juan Montojo, San Diego, CA (US); Durga Prasad Malladi, San Diego, CA (US); Brian Banister, San Diego, CA (US); Alexei Gorokhov, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/482,343

(22) Filed: Apr. 7, 2017

(65) Prior Publication Data

US 2018/0115979 A1 Apr. 26, 2018

Related U.S. Application Data

(60) Provisional application No. 62/412,178, filed on Oct. 24, 2016.

(51) Int. Cl.

| | |
|---|---|
| ***H04W 72/00*** | (2009.01) |
| ***H04W 72/10*** | (2009.01) |
| ***H04W 16/14*** | (2009.01) |
| ***H04W 72/04*** | (2009.01) |
| ***H04W 28/26*** | (2009.01) |

(52) U.S. Cl.

CPC ........... *H04W 72/10* (2013.01); *H04W 16/14* (2013.01); *H04W 28/26* (2013.01); *H04W 72/0446* (2013.01)

(58) Field of Classification Search

CPC ... H04L 1/1854; H04L 25/0204; H04B 7/026; H04B 7/15592; H04B 7/024; H04J 11/0023

USPC ........................................ 455/443, 444, 454

See application file for complete search history.

(56) References Cited

U.S. PATENT DOCUMENTS

| | | | | |
|---|---|---|---|---|
| 2009/0154415 | A1 | 6/2009 | Park et al. | |
| 2011/0044193 | A1* | 2/2011 | Forenza ................ | H04B 7/024 370/252 |
| 2015/0289293 | A1* | 10/2015 | Zhang ..................... | H04W 4/22 455/404.1 |
| 2015/0358968 | A1 | 12/2015 | Malladi et al. | |
| 2016/0212625 | A1 | 7/2016 | Damnjanovic et al. | |

FOREIGN PATENT DOCUMENTS

| | | |
|---|---|---|
| GB | 2510345 A | 8/2014 |

OTHER PUBLICATIONS

International Search Report and Written Opinion—PCT/US2017/057693—ISA/EPO—dated Jan. 24, 2018.

* cited by examiner

*Primary Examiner* — Tu X Nguyen

(74) *Attorney, Agent, or Firm* — Loza & Loza, LLP

(57) ABSTRACT

Aspects of the disclosure relate to wireless communication systems configured to utilize a shared spectrum between two or more network operators. Coexistence between the different network operators on the shared spectrum may be provided by reserving resources for exclusive use by each of the network operators within a period of time that is variable based on the number of network operators. Non-exclusive use of resources may further be granted to one or more network operators in accordance with network operator priorities.

27 Claims, 9 Drawing Sheets

100 106 130 132 BS 114 120 SAS 144 RRH 116 104 146 112 124 136 122 110 134 126 128 102 108 127 140 138 142 118

SCALING OF SHARED SPECTRUM EXCLUSIVE RESOURCES

PRIORITY CLAIM

This application claims priority to and the benefit of Provisional Patent Application No. 62/412,178 filed in the U.S. Patent and Trademark Office on Oct. 24, 2016, the entire content of which is incorporated herein by reference as if fully set forth below in its entirety and for all applicable purposes.

TECHNICAL FIELD

The technology discussed below relates generally to wireless communication systems, and more particularly, to the use of exclusive resources in a shared spectrum. Embodiments can provide and enable techniques for scaling of shared spectrum exclusive resources with the number of operators.

INTRODUCTION

A shared spectrum includes a band or channel that may be shared by two or more different systems or technologies. For example, the shared spectrum may be shared by two or more network operators, each using the same radio access technology (RAT) or different RATs. Further, potentially new technologies may be added in the future by the network operators utilizing the shared spectrum. Broadly, any suitable number of different systems (e.g., different RATs, and/or different operators within each RAT) may share the shared spectrum when they comply with the predetermined or agreed-upon technology restrictions on its use.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum may not be completely unrestricted. That is, not any arbitrary technology may be allowed to access the shared spectrum. Rather, an agreement may be established where certain technology restrictions may be in place to limit which network operators and technologies may access and use the shared spectrum.

Within its unlicensed band, Wi-Fi technology employs a certain carrier sense (CS) or listen-before-talk (LBT) mechanism to control access to its unlicensed band. While this CS mechanism provides for functionality suitable for many purposes, the recent increase in technologies that wish to share access to the unlicensed band have created certain coexistence issues. Accordingly, for the shared spectrum, the CS coexistence mechanism used by Wi-Fi may be less than suitable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for the coexistence of a variety of network operators and technologies for wireless communication on a shared spectrum channel. This coexistence may be provided by reserving resources for exclusive use by each of the network operators within a period of time that is variable based on the number of network operators. Non-exclusive use of resources may further be granted to one or more network operators in accordance with network operator priorities.

In one aspect of the disclosure, a method of wireless communication utilizing a shared spectrum is provided. The method includes determining a number of network operators communicating over a shared spectrum channel, determining a respective priority for each of the network operators on the shared spectrum channel, and for each of the network operators, allocating respective resources on the shared spectrum channel for exclusive use by the respective network operator based on the respective priority. The network operators having higher priorities are allocated a same amount or more of the resources on the shared spectrum channel for exclusive use thereof than the network operators having lower priorities.

Another aspect of the disclosure provides an apparatus within a wireless communication network. The apparatus includes a processor, a memory communicatively coupled to the processor, and a transceiver communicatively coupled to the processor. The processor is configured to determine a number of network operators communicating over a shared spectrum channel, determine a respective priority for each of the network operators on the shared spectrum channel, and for each of the network operators, allocate respective resources on the shared spectrum channel for exclusive use by the respective network operator based on the respective priority. The network operators having higher priorities are allocated a same amount or more of the resources on the shared spectrum channel for exclusive use thereof than the network operators having lower priorities.

Another aspect of the disclosure provides an apparatus within a wireless communication network. The apparatus includes means for determining a number of network operators communicating over a shared spectrum channel, means for determining a respective priority for each of the network operators on the shared spectrum channel, and for each of the network operators, means for allocating respective resources on the shared spectrum channel for exclusive use by the respective network operator based on the respective priority. The network operators having higher priorities are allocated a same amount or more of the resources on the shared spectrum channel for exclusive use thereof than the network operators having lower priorities.

Examples of additional aspects of the disclosure follow. In some aspects of the disclosure, if the number of network operators is less than or equal to a first threshold number, for each of the network operators, a respective first set of resources within a first duration of time may be reserved for exclusive use by the respective network operator. In addition, if the number of network operators is greater than the first threshold number, for each of the network operators within a first set of the network operators, either a respective second set of resources may be reserved within a second duration of time for exclusive use by the respective network operator, where the second duration of time is greater than the first duration of time, or a third set of resources may be reserved within the first duration of time or the second duration of time for non-exclusive use by the first set of the network operators.

In some aspects of the disclosure, if the number of network operators is greater than the first threshold number, for each of the network operators within a second set of the network operators, the respective first set of resources within the first duration of time may be reserved for exclusive use by the respective network operator. In some examples, each of the network operators within the second set of the network operators has a higher priority than each of the network operators within the first set of the network operators. In some examples, the first set of network operators includes all of the network operators when reserving the respective second set of resources within the second duration of time for exclusive use by the respective network operator In some aspects of the disclosure, if the number of network operators is greater than the first threshold number, for each of the network operators within a second set of the network operators, the respective first set of resources within the first duration of time may be reserved for exclusive use by the respective network operator. In addition, if the number of network operators is greater than both the first threshold number and a second threshold number that exceeds the first threshold number, the third set of resources within the first duration of time or the second duration of time may be reserved for non-exclusive use by the first set of the network operators based on the respective priority of the network operators within the first set of the network operators. In some examples, each of the network operators within the first set of network operators has a lower priority than each of the network operators within the second set of network operators.

In some aspects of the disclosure, if the number of network operators is greater than the first threshold number, for each of the network operators within a second set of the network operators, the respective first set of resources within the first duration of time may be reserved for exclusive use by the respective network operator. In addition, if the number of network operators is greater than the first threshold number, for each of the network operators within the first set of the network operators, the respective second set of resources within the second duration of time may be reserved for exclusive use by the respective network operator. Furthermore, if the number of network operators is further greater than a second threshold number that exceeds the first threshold number, the third set of resources within the first duration of time or the second duration of time may be reserved for non-exclusive use by a third set of the network operators. In some examples, each of the network operators within the first set of network operators has a lower priority than each of the network operators within the second set of network operators, and each of the network operators within the third set of network operators has a lower priority than each of the network operators within the first set of network operators.

In some aspects of the disclosure, the first duration of time includes a superframe period and the second duration of time includes two or more superframe periods. In some aspects of the disclosure, the first duration of time includes an acquisition interval and the respective first set of resources for each of the network operators are reserved within the acquisition interval.

In some aspects of the disclosure, the respective first set of resources for each of the network operators includes a respective first downlink slot and a respective first uplink slot within the first duration of time, and the respective second set of resources for each of the network operators within the first set of network operators includes a respective second downlink slot and a respective second uplink slot within the second duration of time.

In some aspects of the disclosure, a first priority for a first network operator of the network operators on the shared spectrum channel may be determined and a second priority for the first network operator on an additional shared spectrum channel may be determined, where the first priority is different than the second priority.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
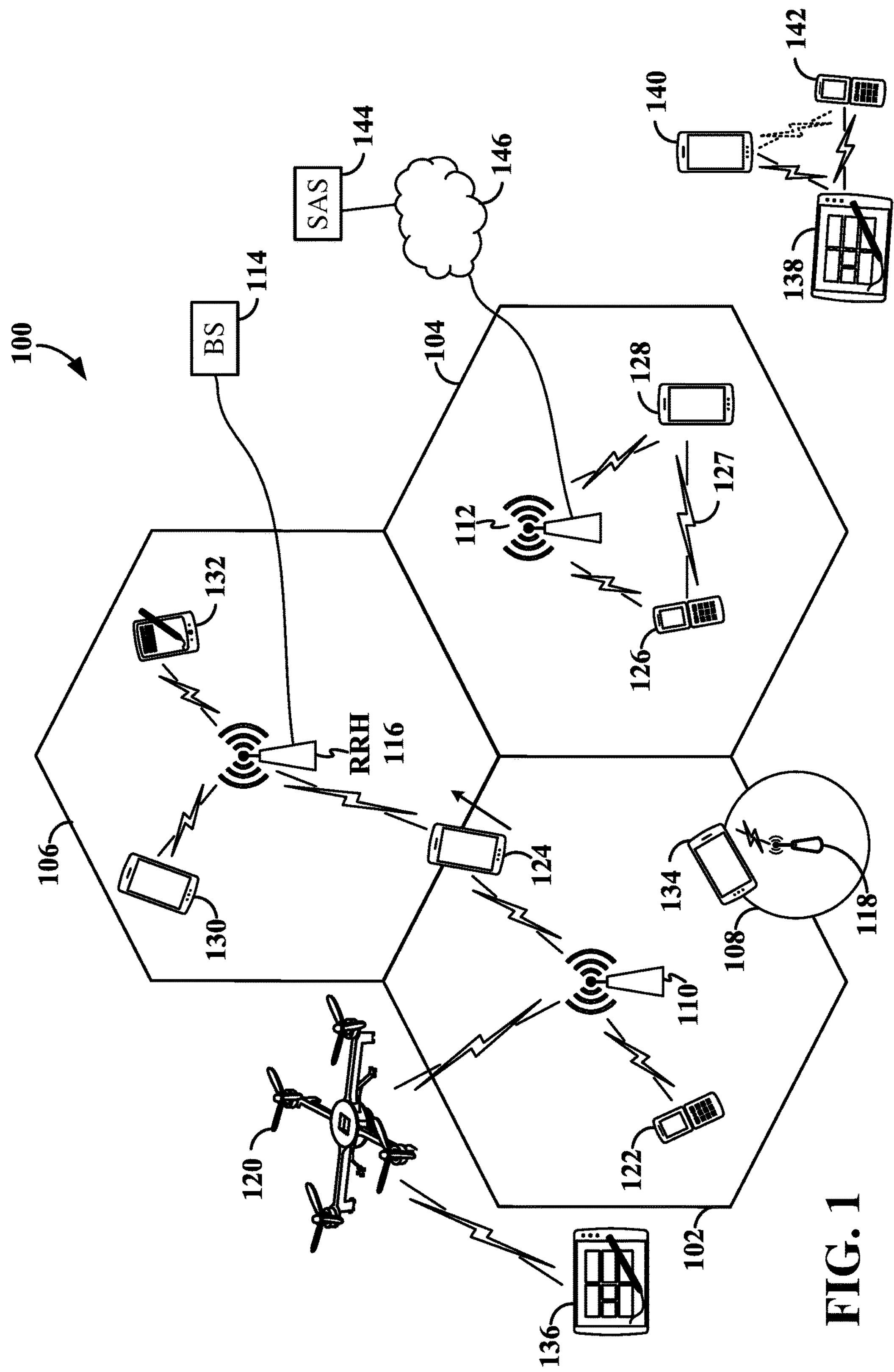
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of lms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

In various aspects of the present disclosure, one or more of the base stations 110, 112, and 114/116 may be operated by different network operators and/or utilize different radio access technologies (RATs), and each may be configured to communicate on a shared spectrum. A shared spectrum may include one or more bands or channels that may be shared by two or more different systems. As used in the present disclosure, a system may refer to a network operator and/or a radio access technology (RAT). That is, the shared spectrum channel may be shared by two or more network operators using the same RAT, and/or two or more RATs, each of which may be utilized by one or more network operators.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum may not be completely unrestricted. That is, not any arbitrary technology may be allowed to access the shared spectrum. Rather, an agreement may be established where certain technology restrictions may be in place to limit which systems and technologies may access and use the shared spectrum.

In a particular implementation, the shared spectrum may occupy any suitable band, such as but not limited to a 3.5 GHz band. In some examples, multiple network operators with the same radio access technology (RAT) may occupy the shared spectrum. In some examples, multiple RATs may occupy the shared spectrum. Further, potentially new technologies may be added in the future to the list of users of the shared spectrum. Broadly, any suitable number of different systems (e.g., different RATs, and/or different network operators within each RAT) may share the shared spectrum when they comply with the predetermined or agreed technology restrictions on its use.

According to an aspect of the disclosure, a suitable coexistence mechanism common across different network operators and across different RATs may be defined to enable this variety of different systems to share the shared spectrum. For example, a common understanding between these systems can enable users of the different systems to be aware of one another and achieve fair access to the shared spectrum. In some examples, access to the shared spectrum channel may be managed by the network (e.g., base stations or other wireless devices communicating on the shared spectrum channel may discover one another and coordinate usage of the shared spectrum channel). In other examples, access to the shared spectrum channel may be managed by a shared access system (SAS) server 144, which may be connected to the access network 100 via, for example, an external data network 146. In some examples, the SAS server 144 may be operated by a third party, instead of by the network or any particular network operator utilizing the shared spectrum channel.

Figure 2:
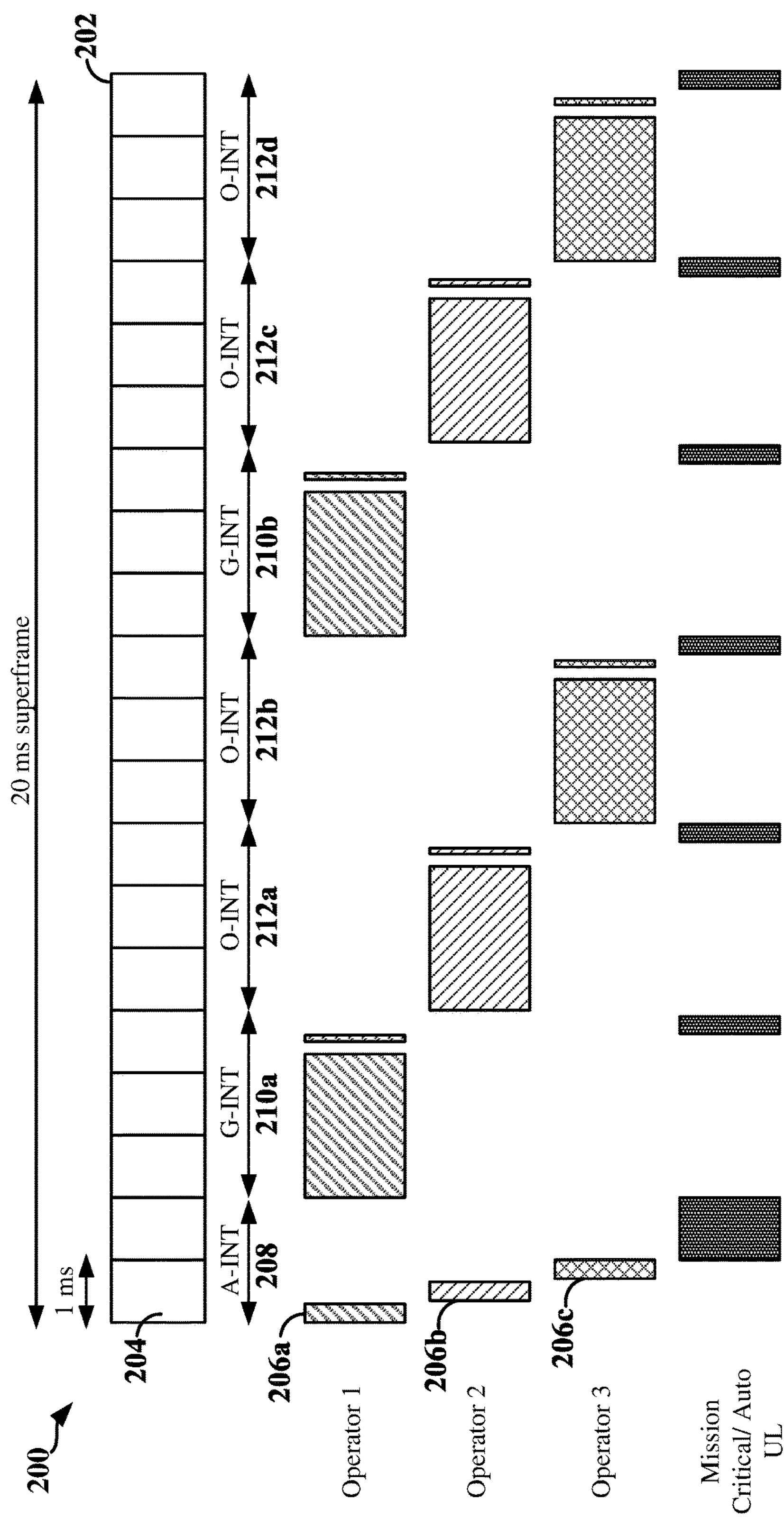
FIG. 2 is a schematic illustration of a coordinated allocation of resources to various network operators communicating over a shared spectrum channel.

FIG. 2 is a schematic illustration of an exemplary coordinated allocation of resources to various network operators communicating over a shared spectrum channel 200. Within a particular duration of time, the resources (e.g., time-frequency resources) may be classified into various intervals according to particular usages. In the example shown in FIG. 2, the resources are classified into acquisition intervals (A-INT) 208, guaranteed intervals (G-INT) 210 and opportunistic intervals (O-INT) 212 within the duration of a superframe (e.g., 20 ms) 202. A superframe 202 may include, for example, twenty subframes 204, each having a duration of 1 ms. A single A-INT 208 is provided within the superframe 202 spanning the duration of the first two subframes 204 in the superframe 202. Multiple G-INTs 210*a*-210*b* and O-INTs 212*a*-212*d* may be allocated within the remainder of the superframe 202.

Within the A-INT 208, resources are dedicated to network operators for the exclusive use thereof to transmit critical control information and user data traffic. Such critical control information may include, for example, one or more synchronization signals, physical broadcast control channel (PBCH), system information blocks (SIBs), and paging messages. Thus, each network operator communicating on the shared spectrum channel (e.g., Operator 1, Operator 2 and Operator 3) may be assigned exclusive resources to communicate downlink (DL) and/or uplink (UL) information within the A-INT. In the example shown in FIG. 2, Operator 1 is assigned a first slot 206*a* within a first subframe 204 of the A-INT to the exclusion of all other network operators (e.g., only Operator 1 may communicate on the shared spectrum channel during the first slot 206*a*). Operator 2 is then assigned a second slot 206*b* following the first slot 206*a*, and Operator 3 is then assigned a third slot 206*c* following the second slot 206*b*. Here, each slot may have a duration of approximately 330 μs and each slot 206*a*-206*c* may be allocated for downlink (DL) transmissions. Following the DL assignments, each network operator may then be assigned exclusive resources for uplink (UL) transmissions within the A-INT. Thus, with three network operators and slot durations of approximately 330 μs, the A-INT shown in FIG. 2 has a granularity of two ms, corresponding to two subframes 204.

Each G-INT 210*a*-210*b* is assigned to a specific network operator to enable that specific network operator to transmit control information and/or user data traffic without medium sensing (e.g., without performing listen-before-talk (LBT)). In the example shown in FIG. 2, Operator 1 is assigned two G-INTs 210*a* and 210*b*, each having a granularity of three ms or three subframes 204. The G-INTs 210*a* and 210*b* may be provided to network operators based on operator priorities and/or Quality of Service (QoS) requirements.

Each O-INT 212*a*-212*d* is an interval where an unassigned network operator can transmit control information and/or user data traffic after determining that the medium is idle (e.g., via LBT). In the example shown in FIG. 2, each O-INT 212*a*-212*d* has a granularity of three ms or three subframes 204 and Operators 2 and 3 may each perform LBT to gain access to the shared spectrum channel during the O-INTs. In addition, the last N symbols of G-INTs 210 and O-INTs 212 may be reserved for mission critical user data traffic and/or uplink transmissions.

As the number of network operators increases, the overhead of the A-INT 208 may linearly increase. In addition, different network operators may have different priorities for accessing the shared spectrum channel. For example, one network operator may have a higher priority on one shared spectrum channel and a lower priority on other shared spectrum channels. In addition, the portion of the overall A-INT 208 transmission period duration may be proportionally divided amongst network operators based on operator priorities to enable operators with higher priorities to achieve higher guaranteed QoS requirements.

In various aspects of the disclosure, to limit the relative overhead of the A-INT 208, while still meeting priority and QoS requirements for network operators, A-INT 208 resources may be reserved for each network operator within a respective period of time that is variable based on the number of network operators. For example, the period of time for some of the network operators may include one superframe 202, while the period of time for other network operators may include two or more superframes 202. In addition, non-exclusive use of resources may further be granted to one or more network operators in accordance with network operator priorities.

Figure 3:
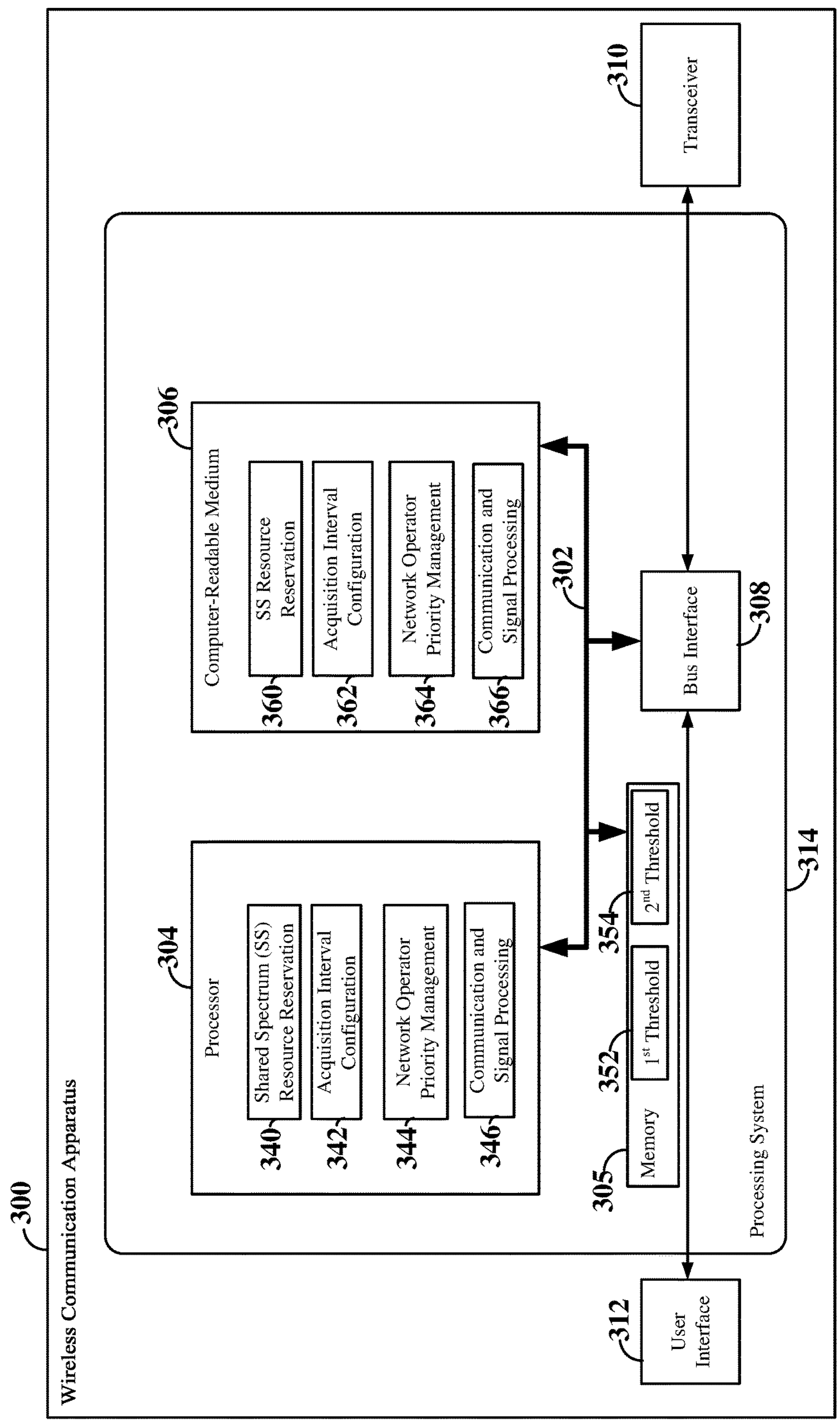
FIG. 3 is a block diagram conceptually illustrating an example of a wireless network apparatus according to some aspects of the present disclosure.

FIG. 3 is a simplified block diagram illustrating an example of a hardware implementation for a wireless network apparatus 300 employing a processing system 314. For example, the wireless network apparatus 300 may be a base station or user equipment as illustrated in FIG. 1. In another example, the wireless network apparatus 300 may be a shared access system (SAS) server operated by a third party to control access to a shared spectrum.

The wireless network apparatus 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 300 may be configured to perform any one or more of the functions described herein. That is, the processor 204, as utilized in a wireless communication device 300, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include shared spectrum (SS) resource reservation circuitry 340. The SS resource reservation circuitry 340 may include one or more hardware components that provide the physical structure that performs various processes related to reserving resources (e.g., time-frequency resources) on a shared spectrum channel in various time intervals to various network operators communicating over the shared spectrum channel. For example, the SS resource reservation circuitry 340 may be configured to reserve resources on the shared spectrum channel during an acquisition interval for network operators to transmit critical control information and user data traffic. In some examples, the critical control information may include a synchronization (SYNC) signal, a physical broadcast control channel (PBCH), a System Information Block (SIB) or a paging message. The SS resource reservation circuitry 340 may operate in coordination with shared spectrum resource reservation software 360.

In some aspects of the disclosure, the SS resource reservation circuitry 340 may divide the resources within each acquisition interval between the network operators such that each network operator has exclusive access to its allocated resources. In some examples, the SS resource reservation circuitry 340 may allocate one downlink (DL) slot and one uplink (UL) slot during each acquisition interval to each network operator for exclusive use by that network operator. In other examples, the SS resource reservation circuitry 340 may allocate one DL slot and one UL slot during only a portion of the acquisition intervals to one or more of the network operators. For example, the SS resource reservation circuitry 340 may allocate one DL slot and one UL slot to a network operator for the exclusive use thereof during every $N^{th}$ acquisition interval, where N is greater than or equal to two.

In some aspects of the disclosure, the SS resource reservation circuitry 340 may further reserve the same resources during an acquisition interval to two or more network operators to provide non-exclusive access to the allocated resources. For example, the SS resource reservation circuitry 340 may reserve resources (e.g., one DL slot and one UL slot) within one or more acquisition intervals for the non-exclusive use by two or more network operators. In this example, the network operators share access to the allocated resources using, for example, a listen-before-talk (LBT) or carrier sense (CS) algorithm.

The LBT or CS algorithm may be similar to LBT or CS algorithms utilized within Wi-Fi networks (e.g., those defined by IEEE 802.11 standards), which typically implement a clear channel assessment (CCA) and a network allocation vector (NAV). CCA involves a device detecting and decoding a Wi-Fi preamble transmitted by another device as a part of a physical layer convergence protocol (PLCP) frame. If a device senses or detects a Wi-Fi signal preamble, it will report the carrier as busy for the length of the frame. CCA further involves the device detecting the energy level of noise and interference on the carrier from non-Wi-Fi sources. The carrier may be reported as busy if an energy detection sample indicates energy above a given threshold. The NAV enables a device to explicitly reserve the carrier for transmission of a number of frames after the current frame. This reservation is made by encoding corresponding information in the PLCP frame header.

In some aspects of the disclosure, the processor 304 may further include acquisition interval configuration circuitry 342. The acquisition interval configuration circuitry may include one or more hardware components that provide the physical structure that performs various processes related to allocating resources during acquisition intervals as a function of the number of network operators communicating on the shared spectrum channel. In some examples, the acquisition interval configuration circuitry 342 may allocate one acquisition interval (A-INT) each superframe period. The A-INT may have a duration, for example, of 2 ms each superframe period. In other examples, the acquisition interval configuration circuitry 342 may allocate more than one A-INT each superframe period to reduce the periodicity of A-INTs. For example, the acquisition interval configuration circuitry 342 may allocate an A-INT having a duration of one ms every five ms. The acquisition interval configuration circuitry 342 may operate in coordination with acquisition interval configuration software 362.

The acquisition interval configuration circuitry 342 may further be configured to map network operators to A-INTs within one or more superframes based on the number of network operators. For example, the acquisition interval configuration circuitry 342 may determine the total number of network operators communicating on the shared spectrum channel. In some examples, the wireless communication apparatus 300 may be a third party shared access system (SAS) server and the acquisition interval configuration circuitry 342 may determine the number of network operators registered with the SAS server. In other examples, the wireless communication apparatus 300 may be a network device (e.g., a base station or other wireless communication device) communicating on the shared spectrum channel and the acquisition interval configuration circuitry 342 may determine the number of network operators discovered by the network device on the shared spectrum channel. In other examples, any suitable algorithm may be utilized to determine the number of network operators.

The acquisition interval configuration circuitry 342 may further compare the number of network operators to a first threshold number 352 maintained, for example, in memory 305. If the number of network operators is less than or equal to the first threshold number 352, the acquisition interval configuration circuitry 342 may map all network operators to each A-INT within each superframe. For example, the acquisition interval configuration circuitry 342 may instruct the SS resource reservation circuitry 340 to reserve exclusive resources for each network operator during each A-INT (i.e., during each superframe). The SS resource reservation circuitry 340 may then reserve one DL slot and one UL slot for each network operator during each A-INT.

However, if the number of network operators is greater than the first threshold number 352, the acquisition interval configuration circuitry 342 may map a set of the network operators to a subset of the A-INTs. For example, the acquisition interval configuration circuitry 342 may instruct the SS resource reservation circuitry 340 to allocate one DL slot and one UL slot to each network operator within the set of network operators for the exclusive use thereof during every $N^{th}$ acquisition interval, where N is greater than or equal to two. In some examples, the set of network operators includes all of the network operators. In other examples, the set of network operators includes less than all of the network operators. Thus, when each superframe includes only one A-INT, at least a portion of the network operators may be assigned exclusive A-INT resources within non-consecutive superframes. As such, the A-INT allocation for at least a portion of the network operators is effectively decimated in time and the amount of exclusive resources reserved for these network operators is effectively reduced. Stated another way, the A-INT resources for the set of network operators are reserved within a duration of time (e.g., 40 ms or longer corresponding to two or more superframes) that is greater than the duration of time (e.g., 20 ms corresponding to one superframe) utilized when the number of network operators is less than or equal to the threshold number.

The acquisition interval configuration circuitry 342 may select the network operators for reduced A-INT allocations based on, for example, the priorities of the respective network operators. For example, the network operators with higher priorities, and therefore, higher QoS requirements, may be assigned resources within each A-INT or within a greater subset of the A-INTs, while network operators with lower priorities may be assigned resources within a lower subset of the A-INTs. The particular A-INTs selected for each network operator within the set of network operators may be staggered such that not each network operator within the set of network operators is assigned resources within the same A-INT. For example, one network operator within the set of network operators may be assigned resources within a first A-INT, while another network operator within the set of network operators may be assigned resources within a second A-INT.

The acquisition interval configuration circuitry 342 may further be configured to compare the number of network operators to a second threshold number 354 greater than the first threshold number 352 and maintained, for example, in memory 305. If the number of network operators is less than or equal to the second threshold number 354, the acquisition interval configuration circuitry 342 may map network operators to A-INTs as described above when the number of network operators is greater than the first threshold number 352. If the number of network operators is greater than the second threshold number, the acquisition interval configuration circuitry 342 may map network operators to non-exclusive resources within A-INTs. For example, the acquisition interval configuration circuitry 342 may instruct the shared spectrum resource reservation circuitry 340 to reserve resources (e.g., one DL slot and one UL slot) within one or more A-INTs for the non-exclusive use by another set of two or more network operators. In this example, the network operators share access to the allocated resources using, for example, a listen-before-talk (LBT) or carrier sense (CS) algorithm.

In some examples, the acquisition interval configuration circuitry 342 may select the network operators for shared non-exclusive access based on the priorities of the respective network operators. For example, the network operators with higher priorities, and therefore, higher QoS requirements, may be assigned exclusive resources within each A-INT or within a subset of the A-INTs, while network operators with lower priorities may be assigned non-exclusive resources within each A-INT or a subset of the A-INTs.

In some aspects of the disclosure, the processor 304 may further include network operator priority management circuitry 344. The network operator priority management circuitry 344 may include one or more hardware components that provide the physical structure that performs various processes related to determining a priority assigned to each of the network operators communicating over the shared spectrum channel. In some aspects of the disclosure, the network operator priority management circuitry 344 may operate in coordination with the acquisition interval configuration circuitry 342 and the SS resource reservation circuitry 340 to allocate resources on the shared spectrum channel during A-INTs based on the respective priorities of each of the network operators. The network operator priority management circuitry 344 may operate in coordination with network operator priority management software 364.

In some aspects of the disclosure, the processor 304 may further include communication and signal processing circuitry 346. The communication and signal processing circuitry 346 may include one or more hardware components that provide the physical structure that performs various processes related to wireless communication (e.g., signal reception and/or signal transmission) and signal processing (e.g., processing a received signal and/or processing a signal for transmission) as described herein. For example, the communication and signal processing circuitry 346 may be configured to transmit and/or receive control information and/or user data traffic via the transceiver 310. The communication and signal processing circuitry 346 may operate in coordination with communication and signal processing software 366.

Figure 4:
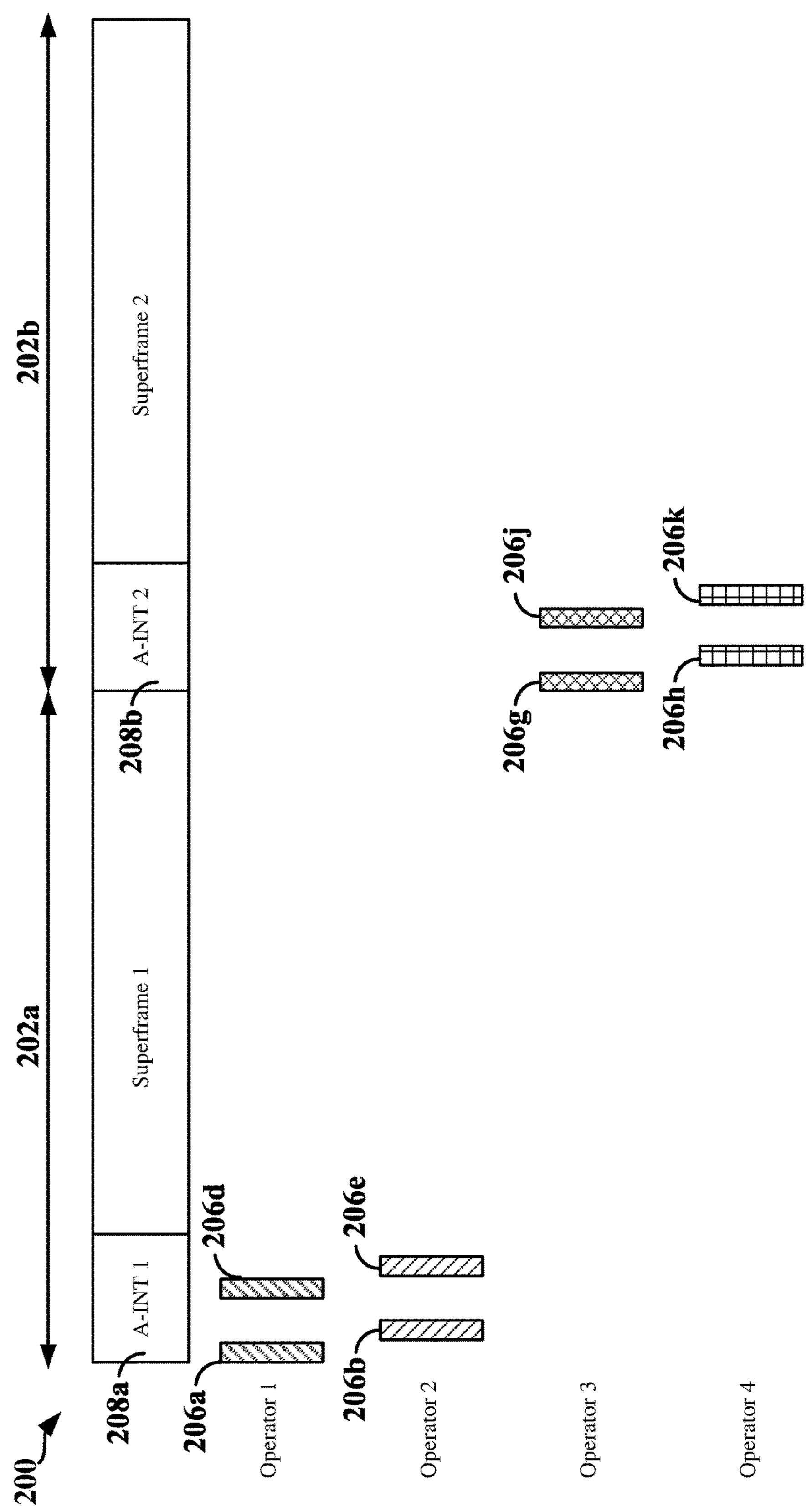
FIG. 4 is a schematic illustration of a coordinated allocation of resources to various network operators within acquisition intervals (A-INTs) on a shared spectrum channel according to some aspects of the present disclosure.

FIG. 4 is schematic illustration of a coordinated allocation of resources to various network operators within acquisition intervals (A-INTs) 208 on a shared spectrum channel 200 according to some embodiments. As illustrated in FIG. 4, there are four network operators (Operator 1, Operator 2, Operator 3, and Operator 4). In the example shown in FIG. 4, resources (e.g., downlink slots 206*a* and 206*b* and uplink slots 206*d* and 206*e*) have been exclusively reserved to Operator 1 and Operator 2 within a first A-INT (A-INT 1) 208*a* within a first superframe (Superframe 1) 202*a*. In addition, resources (e.g., downlink slots 206*g* and 206*h* and uplink slots 206*j* and 206*k*) have been exclusively reserved to Operator 3 and Operator 4 within a second A-INT (A-INT 2) 208*b* within a second superframe (Superframe 2) 202*b*. Thus, in the example shown in FIG. 4, exclusive resources have been reserved equally for each network operator. However, the amount of exclusive resources reserved for each of the network operators has been effectively reduced, in comparison to FIG. 2, where each network operator was allocated exclusive resources in each superframe.

Figure 5:
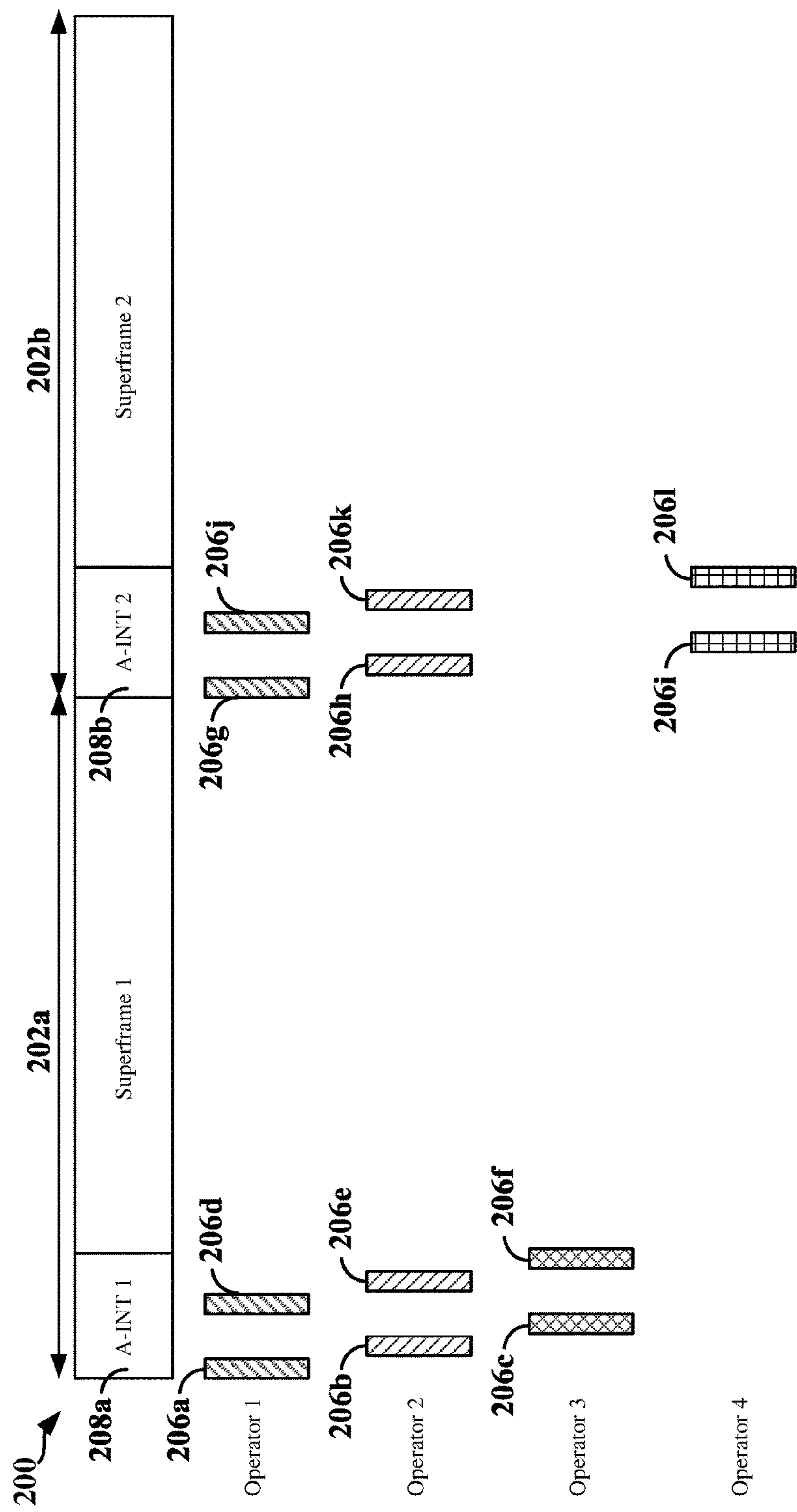
FIG. 5 is a schematic illustration of another coordinated allocation of resources to various network operators within A-INTs on a shared spectrum channel according to some aspects of the present disclosure.

FIG. 5 is schematic illustration of another coordinated allocation of resources to various network operators within acquisition intervals (A-INTs) 208 on a shared spectrum channel 200 according to some embodiments. In the example shown in FIG. 5, a first set of network operators (e.g., Operator 1 and Operator 2) have been allocated exclusive resources within each of the superframes (e.g., within A-INT 208*a* of superframe 202*a* and A-INT 208*b* of superframe 202*b*), similar to that illustrated in FIG. 2. For example, Operator 1 has been allocated downlink slot 206*a* and uplink slot 206*d* within A-INT 208*a* of superframe 202*a*, and downlink slot 206*g* and uplink slot 206*j* within A-INT 208*b* of superframe 202*b*. Likewise, Operator 2 has been allocated downlink slot 206*b* and uplink slot 206*e* within A-INT 208*a* of superframe 202*a*, and downlink slot 206*h* and uplink slot 206*k* within A-INT 208*b* of superframe 208*b*.

However, a second set of network operators (e.g., Operator 3 and Operator 4) have been allocated exclusive resources within only a subset of the superframes. For example, Operator 3 has been allocated exclusive resources (e.g., downlink slot 206*c* and uplink slot 206*f*) within A-INT 208*a* of superframe 202*a*, while Operator 4 has been allocated exclusive resources (e.g., downlink slot 206*i* and uplink slot 206*l*) within A-INT 208*b* of superframe 202*b*. Thus, the amount of exclusive resources reserved for Operators 3 and 4 has been effectively reduced, in comparison to FIG. 2

Figure 6:
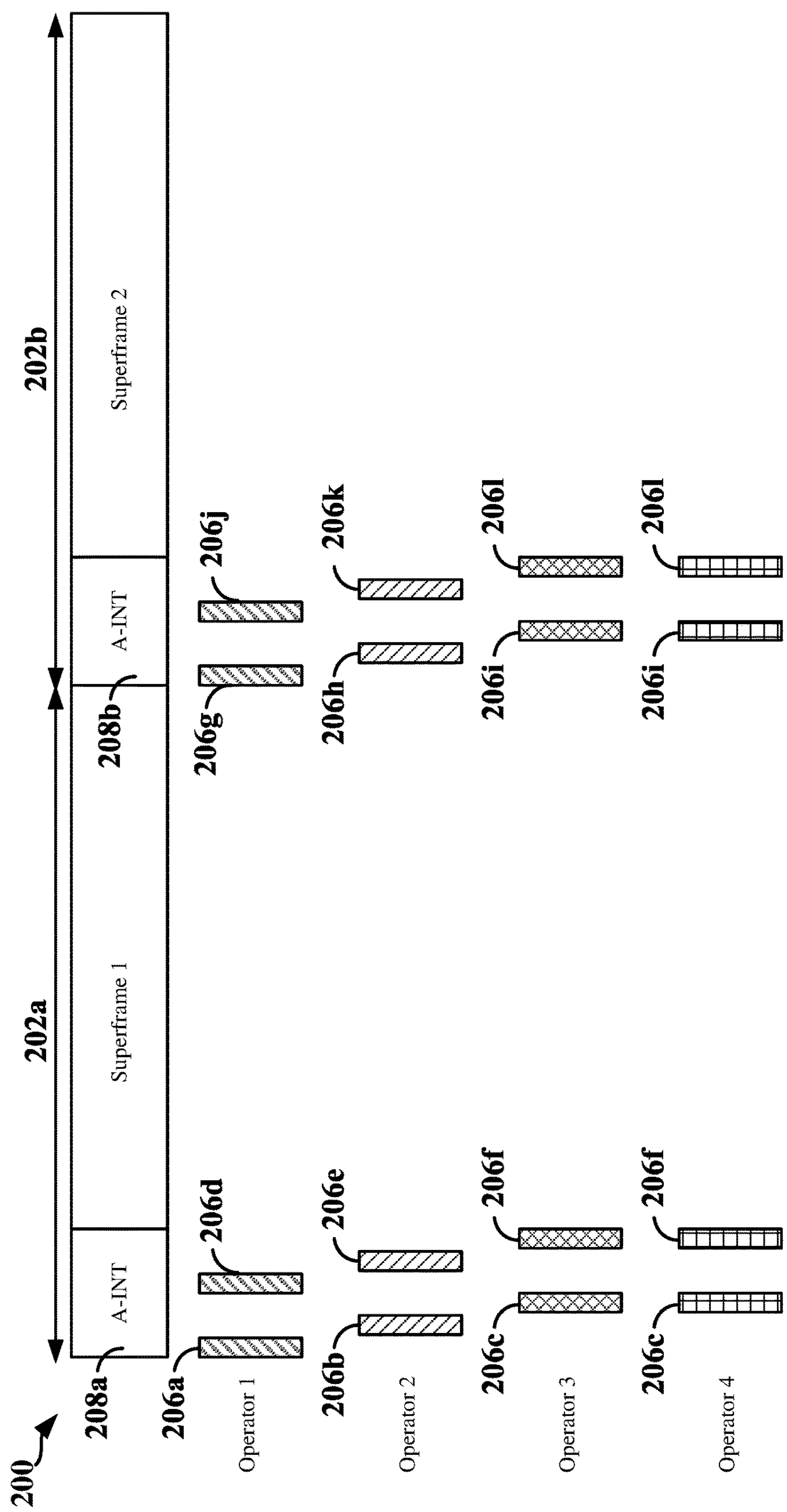
FIG. 6 is a schematic illustration of another coordinated allocation of resources to various network operators within A-INTs on a shared spectrum channel according to some aspects of the present disclosure.

FIG. 6 is schematic illustration of another coordinated allocation of resources to various network operators within acquisition intervals (A-INTs) 208 on a shared spectrum channel 200 according to some embodiments. In the example shown in FIG. 6, a first set of network operators (e.g., Operator 1 and Operator 2) have been allocated exclusive resources within each of the superframes (e.g., within A-INT 208*a* of superframe 202*a* and A-INT 208*b* of superframe 202*b*), similar to that illustrated in FIG. 2. For example, Operator 1 has been allocated downlink slot 206*a* and uplink slot 206*d* within A-INT 208*a* of superframe 202*a*, and downlink slot 206*g* and uplink slot 206*j* within A-INT 208*b* of superframe 202*b*. Likewise, Operator 2 has been allocated downlink slot 206*b* and uplink slot 206*e* within A-INT 208*a* of superframe 202*a*, and downlink slot 206*h* and uplink slot 206*k* within A-INT 208*b* of superframe 208*b*.

However, a second set of network operators (e.g., Operator 3 and Operator 4) have been allocated non-exclusive resources within each of the superframes. For example, Operators 3 and 4 have been allocated the same set of resources within both A-INT 208*a* and A-INT 208*b*. For example, Operators 3 and 4 have each been allocated downlink slot 206*c* and uplink slot 206*f* within A-INT 208*a* of superframe 202*a* and downlink slot 206*i* and uplink slot 206*l* within A-INT 208*b* of superframe 202*b*. In this example, Operators 3 and 4 may share access to the allocated resources using, for example, a listen-before-talk (LBT) or carrier sense (CS) algorithm.

Figure 7:
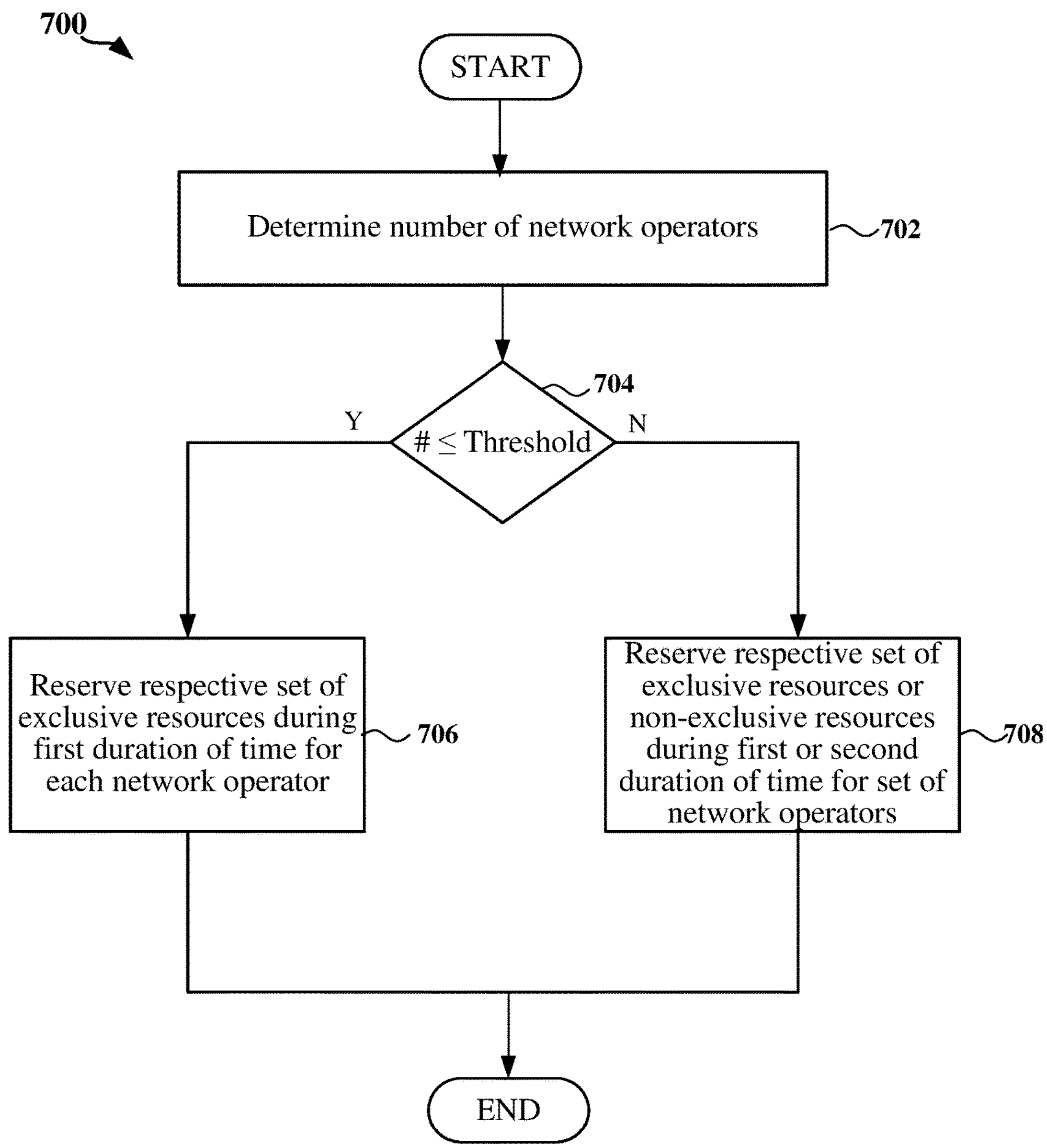
FIG. 7 is a flow chart illustrating a process for wireless communication utilizing a shared spectrum channel according to some aspects of the present disclosure.

FIG. 7 is a flow chart illustrating a process 700 for wireless communication utilizing a shared spectrum according to an aspect of the disclosure. As described below, some or all illustrated features may be omitted in a particular implementation within the scope of the present disclosure, and some illustrated features may not be required for implementation of all embodiments. In some examples, the process 700 may be carried out by the wireless communication apparatus illustrated in FIG. 3. In some examples, the process 700 may be carried out by any suitable apparatus or means for carrying out the functions or algorithm described below.

At block 702, the wireless communication apparatus may determine the number of network operators communicating on a shared spectrum channel. In some examples, the wireless communication apparatus may be a third party shared access system (SAS) server with which the network operators register or a network device (e.g., a base station or other wireless communication device) communicating on the shared spectrum channel that may discover the other network operators communicating on the shared spectrum channel. For example, the communication and signal processing circuitry 346 shown and described above in reference to FIG. 3 may determine the number of network operators communicating on the shared spectrum channel.

At block 704, the wireless communication apparatus may determine if the number of network operators is less than or equal to a threshold number. For example, the acquisition interval configuration circuitry 342 shown and described above in connection with FIG. 3 may determine the number of network operators communicating on the shared spectrum channel and whether the number of network operators is less than or equal to the threshold number.

If the number of network operators is less than or equal to the threshold number (Y branch of block 704), at block 706, the wireless communication apparatus may reserve a respective set of exclusive resources for each network operator during a first duration of time (e.g., during a superframe). In some examples, the wireless communication apparatus may reserve a different set of resources during an A-INT of a superframe for each network operator to enable each network operator to exclusively utilize its respective reserved resources for the transmission of critical control information and user data traffic. For example, the acquisition interval configuration circuitry 342 in combination with the SS resource reservation circuitry 340 shown and described above in connection with FIG. 3 may reserve respective resources for each network operator for the exclusive use thereof within the first duration of time.

If the number of network operators is not less than or equal to the threshold number (N branch of block 706), at block 708, the wireless communication apparatus may either reserve a respective set of exclusive resources for a set of network operators during a second duration of time (e.g., over two or more superframes) greater than the first duration of time or reserve a set of resources within the first or second duration of time for non-exclusive use by the set of network operators. In some examples, for at least a portion of the network operators corresponding to the set of network operators, exclusive resources are reserved with a longer periodicity. As such, the amount of resources exclusively reserved to each network operator within the set of network operators is effectively reduced. In other examples, the same resources during an acquisition interval may be allocated to two or more network operators to provide non-exclusive access to the allocated resources. In this example, the network operators share access to the allocated resources using, for example, a listen-before-talk (LBT) or carrier sense (CS) algorithm. For example, the acquisition interval configuration circuitry 342 in combination with the SS resource reservation circuitry 340 shown and described above in connection with FIG. 3 may either reserve respective resources for each network operator within a set of network operators for the exclusive use thereof within a second duration of time or reserve a set of resources within the first or second duration of time for non-exclusive use by the set of network operators.

Figure 8:
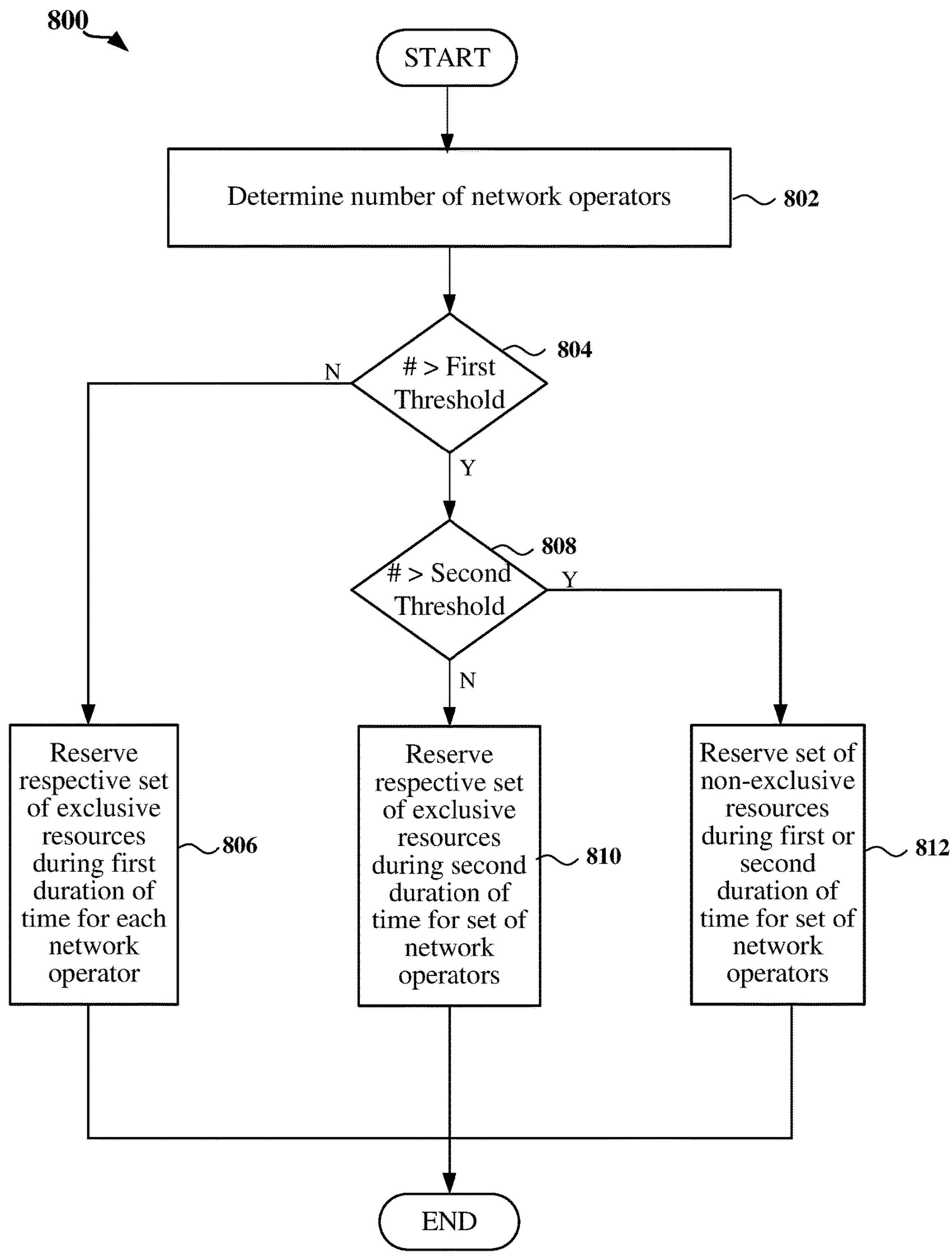
FIG. 8 is a flow chart illustrating another process for wireless communication utilizing a shared spectrum channel according to some aspects of the present disclosure.

FIG. 8 is a flow chart illustrating a process 800 for wireless communication utilizing a shared spectrum according to a further aspect of the disclosure. As described below, some or all illustrated features may be omitted in a particular implementation within the scope of the present disclosure, and some illustrated features may not be required for implementation of all embodiments. In some examples, the process 800 may be carried out by the wireless communication apparatus illustrated in FIG. 3. In some examples, the process 800 may be carried out by any suitable apparatus or means for carrying out the functions or algorithm described below.

At block 802, the wireless communication apparatus may determine the number of network operators communicating on a shared spectrum channel. In some examples, the wireless communication apparatus may be a third party shared access system (SAS) server with which the network operators register or a network device (e.g., a base station or other wireless communication device) communicating on the shared spectrum channel that may discover the other network operators communicating on the shared spectrum channel. For example, the communication and signal processing circuitry 346 shown and described above in reference to FIG. 3 may determine the number of network operators communicating on the shared spectrum channel.

At block 804, the wireless communication apparatus may determine if the number of network operators is greater than a first threshold number. For example, the acquisition interval configuration circuitry 342 shown and described above in connection with FIG. 3 may determine the number of network operators communicating on the shared spectrum channel and may determine whether the number of network operators is greater than the first threshold number.

If the number of network operators is not greater the first threshold number (N branch of block 804), at block 806, the wireless communication apparatus may reserve a respective set of exclusive resources for each network operator during a first duration of time (e.g., during a superframe). In some examples, the wireless communication apparatus may reserve a different set of resources (e.g., one DL slot and one UL slot) during an A-INT of a superframe for each network operator to enable each network operator to exclusively utilize its respective reserved resources for the transmission of critical control information and user data traffic. For example, the acquisition interval configuration circuitry 342 in combination with the SS resource reservation circuitry 340 shown and described above in connection with FIG. 3 may reserve respective resources for each network operator for the exclusive use thereof within the first duration of time.

If the number of network operators is greater than the first threshold number (Y branch of block 806), at block 808, the wireless communication apparatus determines whether the number of network operators is greater than a second threshold number. If the number of network operators is not greater than the second threshold number (N branch of block 808), at block 810, the wireless communication apparatus may reserve a respective set of exclusive resources for a set of network operators during a second duration of time (e.g., over two or more superframes) greater than the first duration of time. Thus, for at least a portion of the network operators corresponding to the set of network operators, exclusive resources (e.g., one DL slot and one UL slot) are reserved with a longer periodicity. As such, the amount of resources exclusively reserved to each network operator within the set of network operators is effectively reduced. For example, the acquisition interval configuration circuitry 342 in combination with the SS resource reservation circuitry 340 shown and described above in connection with FIG. 3 may determine whether the number of network operators is greater than the second threshold number and reserve respective resources for each network operator within a set of network operators for the exclusive use thereof within a second duration of time.

If the number of network operators is greater than the second threshold number (Y branch of block 808), at block 812, the wireless communication apparatus may reserve a set of non-exclusive resources during the first or second duration of time for a set of network operators. In some examples, the wireless communication apparatus may reserve resources (e.g., one DL slot and one UL slot) within one or more A-INTs for the non-exclusive use by a set of two or more network operators. In this example, the network operators may share access to the allocated resources using, for example, a listen-before-talk (LBT) or carrier sense (CS) algorithm. For example, the acquisition interval configuration circuitry 342 in combination with the SS resource reservation circuitry 340 shown and described above in connection with FIG. 3 may reserve non-exclusive resources for use by a set of network operators within the first or second duration of time.

Figure 9:
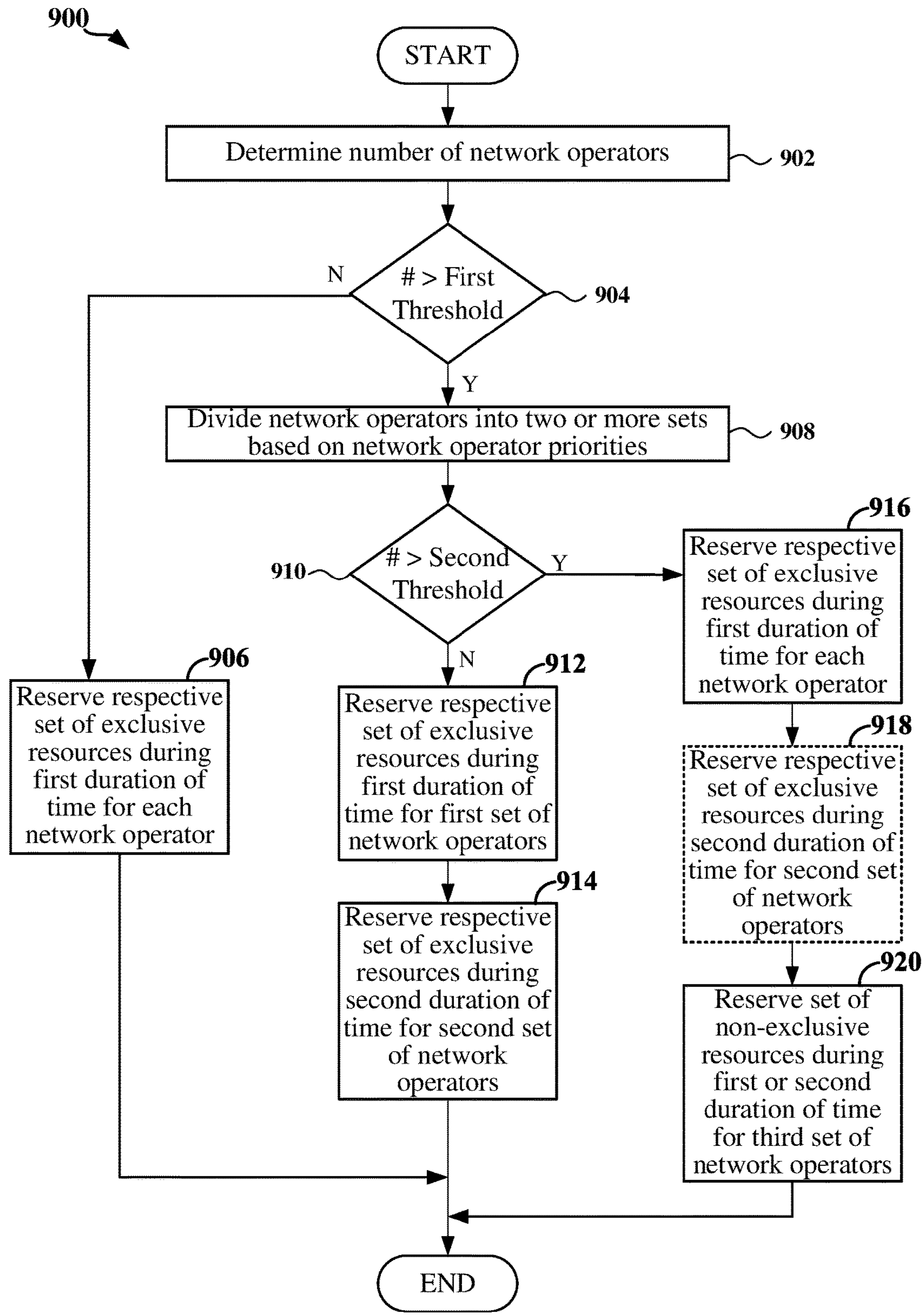
FIG. 9 is a flow chart illustrating another process for wireless communication utilizing a shared spectrum channel according to some aspects of the present disclosure.

FIG. 9 is a flow chart illustrating a process 900 for wireless communication utilizing a shared spectrum according to a further aspect of the disclosure. As described below, some or all illustrated features may be omitted in a particular implementation within the scope of the present disclosure, and some illustrated features may not be required for implementation of all embodiments. In some examples, the process 900 may be carried out by the wireless communication apparatus illustrated in FIG. 3. In some examples, the process 800 may be carried out by any suitable apparatus or means for carrying out the functions or algorithm described below.

At block 902, the wireless communication apparatus may determine the number of network operators communicating on a shared spectrum channel. In some examples, the wireless communication apparatus may be a third party shared access system (SAS) server with which the network operators register or a network device (e.g., a base station or other wireless communication device) communicating on the shared spectrum channel that may discover the other network operators communicating on the shared spectrum channel. For example, the communication and signal processing circuitry 346 shown and described above in reference to FIG. 3 may determine the number of network operators communicating on the shared spectrum channel.

At block 904, the wireless communication apparatus may determine if the number of network operators is greater than a first threshold number. For example, the acquisition interval configuration circuitry 342 shown and described above in connection with FIG. 3 may determine the number of network operators communicating on the shared spectrum channel and may determine whether the number of network operators is greater than the first threshold number.

If the number of network operators is not greater the first threshold number (N branch of block 904), at block 906, the wireless communication apparatus may reserve a respective set of exclusive resources for each network operator during a first duration of time (e.g., during a superframe). In some examples, the wireless communication apparatus may reserve a different set of resources (e.g., one DL slot and one UL slot) during an A-INT of a superframe for each network operator to enable each network operator to exclusively utilize its respective reserved resources for the transmission of critical control information and user data traffic. For example, the acquisition interval configuration circuitry 342 in combination with the SS resource reservation circuitry 340 shown and described above in connection with FIG. 3 may reserve respective resources for each network operator for the exclusive use thereof within the first duration of time.

If the number of network operators is greater than the first threshold number (Y branch of block 906), at block 908, the wireless communication apparatus divides the network operators into at least two set of network operators based on the respective priorities of each of the network operators. For example, the wireless communication apparatus may divide the network operators into a first set of network operators, a second set of network operators, and a third set of network operators. The network operators within the first set of network operators may each have a priority higher than the priorities of the network operators in either the second or third sets of network operators. In addition, each of the network operators within the third set of network operators may have a lower priority than each of the network operators in the first and second sets of network operators. For example, the network operator priority management circuitry 344 may divide the network operators into two or more sets of network operators based on their respective priorities.

At block 910, the wireless communication apparatus determines whether the number of network operators is greater than a second threshold number. If the number of network operators is not greater than the second threshold number (N branch of block 910), at block 912, the wireless communication apparatus may reserve a first set of exclusive resources for a first set of operators during the first duration of time (e.g., during a superframe), and at block 914, reserve a second respective set of exclusive resources for a second set of network operators during a second duration of time (e.g., over two or more superframes) greater than the first duration of time. Thus, for at least a portion of the network operators corresponding to the second set of network operators, exclusive resources (e.g., one DL slot and one UL slot) are reserved with a longer periodicity. As such, the amount of resources exclusively reserved to each network operator within the set of network operators is effectively reduced. For example, the acquisition interval configuration circuitry 342 in combination with the SS resource reservation circuitry 340 shown and described above in connection with FIG. 3 may determine whether the number of network operators is greater than the second threshold number, and if not, reserve respective resources for each network operator within each set of network operators for the exclusive use thereof within different durations of time.

If the number of network operators is greater than the second threshold number (Y branch of block 910), at block 916, the wireless communication apparatus may reserve a first set of exclusive resources for a first set of operators during the first duration of time (e.g., during a superframe). In addition, at block 918, the wireless communication apparatus may further optionally reserve a second respective set of exclusive resources for a second set of network operators during a second duration of time (e.g., over two or more superframes) greater than the first duration of time. At block 920, the wireless communication apparatus may further reserve a third set of non-exclusive resources during the first or second duration of time for a third set of network operators. For example, the network operators with the highest priorities, and therefore, the highest QoS requirements, may be assigned exclusive resources within each of the A-INTs at block 916, the network operators with the next highest priorities may be assigned exclusive resources within a subset of the A-INTs at block 918, while network operators with the lowest priorities may be assigned non-exclusive resources within each A-INT or a subset of the A-INTs at block 920. For example, the acquisition interval configuration circuitry 342 in combination with the SS resource reservation circuitry 340 shown and described above in connection with FIG. 3 may determine whether the number of network operators is greater than the second threshold number, and if so, reserve respective resources for each network operator within each set of network operators for exclusive or non-exclusive use thereof within respective durations of time.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and/or 3 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication utilizing a shared spectrum, comprising:

determining a number of network operators communicating over a shared spectrum channel;

determining a respective priority for each of the network operators on the shared spectrum channel;

for each of the network operators, allocating respective resources on the shared spectrum channel for exclusive use by the respective network operator based on the respective priority, wherein the network operators having higher priorities are allocated a same amount or more of the resources on the shared spectrum channel for exclusive use thereof than the network operators having lower priorities, wherein allocating respective resources on the shared spectrum channel further comprises:

if the number of the network operators is less than or equal to a first threshold number, for each of the network operators, reserving a respective first set of resources within a first duration of time for exclusive use by the respective network operator based on the respective priority; and if the number of the network operators is greater than the first threshold number, for each of the network operators within a first set of the network operators:

reserving a respective second set of resources within a second duration of time for exclusive use by the respective network operator based on the respective priority, wherein the second duration of time is greater than the first duration of time; or reserving a third set of resources within the first duration of time or the second duration of time for non-exclusive use by the first set of the network operators; and allocating additional resources on the shared spectrum channel for non-exclusive use by the network operators.

2. The method of claim 1, wherein allocating respective resources on the shared spectrum channel further comprises:

if the number of the network operators is greater than the first threshold number, for each of the network operators within a second set of the network operators, reserving the respective first set of resources within the first duration of time for exclusive use by the respective network operator.

3. The method of claim 2, wherein each of the network operators within the second set of the network operators has a higher priority than each of the network operators within the first set of the network operators.

4. The method of claim 1, wherein the first set of the the network operators comprises all of the network operators when reserving the respective second set of resources within the second duration of time for exclusive use by the respective network operator.

5. The method of claim 1, further comprising:

if the number of the network operators is greater than the first threshold number, for each of the network operators within a second set of the network operators, reserving the respective first set of resources within the first duration of time for exclusive use by the respective network operator; and if the number of the network operators is greater than both the first threshold number and a second threshold number that exceeds the first threshold number, reserving the third set of resources within the first duration of time or the second duration of time for non-exclusive use by the first set of the network operators based on the respective priority of the network operators within the first set of the network operators.

6. The method of claim 5, wherein each of the network operators within the first set of the network operators has a lower priority than each of the network operators within the second set of the network operators.

7. The method of claim 1, further comprising:

if the number of the network operators is greater than the first threshold number, for each of the network operators within a second set of the network operators, reserving the respective first set of resources within the first duration of time for exclusive use by the respective network operator;

if the number of the network operators is greater than the first threshold number, for each of the network operators within the first set of the network operators, reserving the respective second set of resources within the second duration of time for exclusive use by the respective network operator; and if the number of the network operators is further greater than a second threshold number that exceeds the first threshold number, reserving the third set of resources within the first duration of time or the second duration of time for non-exclusive use by a third set of the network operators;

wherein each of the network operators within the first set of network operators has a lower priority than each of the network operators within the second set of network operators and each of the network operators within the third set of network operators has a lower priority than each of the network operators within the first set of network operators.

8. The method of claim 7, wherein the first duration of time comprises a superframe period and the second duration of time comprises two or more superframe periods.

9. The method of claim 1, wherein:

the respective first set of resources for each of the network operators comprises a respective first downlink slot and a respective first uplink slot within the first duration of time; and the respective second set of resources for each of the network operators within the first set of network operators comprises a respective second downlink slot and a respective second uplink slot within the second duration of time.

10. The method of claim 1, wherein:

the first duration of time comprises an acquisition interval; and the respective first set of resources for each of the network operators are reserved within the acquisition interval.

11. The method of claim 1, further comprising:

determining a first priority for a first network operator of the network operators on the shared spectrum channel; and determining a second priority for the first network operator on an additional shared spectrum channel;

wherein the first priority is different than the second priority.

12. An apparatus within a wireless communication network, comprising:

a processor;

a memory communicatively coupled to the processor; and a transceiver communicatively coupled to the processor, wherein the processor is configured to:

determine a number of network operators communicating over a shared spectrum channel;

determine a respective priority for each of the network operators on the shared spectrum channel;

for each of the network operators, allocate respective resources on the shared spectrum channel for exclusive use by the respective network operator based on the respective priority, wherein the network operators having higher priorities are allocated a same amount or more of the resources on the shared spectrum channel for exclusive use thereof than the network operators having lower priorities, wherein the respective resources are allocated on the shared spectrum channel for exclusive use by:

if the number of the network operators is less than or equal to a first threshold number, for each of the network operators, reserving a respective first set of resources within a first duration of time for exclusive use by the respective network operator based on the respective priority; and if the number of the network operators is greater than the first threshold number, for each of the network operators within a first set of the network operators:

reserving a respective second set of resources within a second duration of time for exclusive use by the respective network operator based on the respective priority, wherein the second duration of time is greater than the first duration of time; or reserving a third set of resources within the first duration of time or the second duration of time for non-exclusive use by the first set of the network operators; and allocate additional resources on the shared spectrum channel for non-exclusive use by the network operators.

13. The apparatus of claim 12, wherein the processor is further configured to:

if the number of the network operators is greater than the first threshold number, for each of the network operators within a second set of the network operators, reserve the respective first set of resources within the first duration of time for exclusive use by the respective network operator.

14. The apparatus of claim 13, wherein each of the network operators within the second set of the network operators has a higher priority than each of the network operators within the first set of the network operators.

15. The apparatus of claim 12, wherein the first set of the network operators comprises all of the network operators when reserving the respective second set of resources within the second duration of time for exclusive use by the respective network operator.

16. The apparatus of claim 12, wherein the processor is further configured to:

if the number of the network operators is greater than the first threshold number, for each of the network operators within a second set of the network operators, reserve the respective first set of resources within the first duration of time for exclusive use by the respective network operator; and if the number of the network operators is greater than both the first threshold number and a second threshold number that exceeds the first threshold number, reserve the third set of resources within the first duration of time or the second duration of time for non-exclusive use by the first set of the network operators based on the respective priority of the network operators within the first set of the network operators.

17. The apparatus of claim 16, wherein each of the network operators within the first set of network operators has a lower priority than each of the network operators within the second set of network operators.

18. The apparatus of claim 12, wherein the processor is further configured to:

if the number of the network operators is greater than the first threshold number, for each of the network operators within a second set of the network operators, reserve the respective first set of resources within the first duration of time for exclusive use by the respective network operator;

if the number of the network operators is greater than the first threshold number, for each of the network operators within the first set of the network operators, reserve the respective second set of resources within the second duration of time for exclusive use by the respective network operator; and if the number of the network operators is further greater than a second threshold number that exceeds the first threshold number, reserve the third set of resources within the first duration of time or the second duration of time for non-exclusive use by a third set of the network operators;

wherein each of the network operators within the first set of network operators has a lower priority than each of the network operators within the second set of network operators and each of the network operators within the third set of network operators has a lower priority than each of the network operators within the first set of network operators.

19. The apparatus of claim 12, wherein the first duration of time comprises a superframe period and the second duration of time comprises two or more superframe periods.

20. An apparatus within a wireless communication network, comprising:

means for determining a number of network operators communicating over a shared spectrum channel;

means for determining a respective priority for each of the network operators on the shared spectrum channel;

for each of the network operators, means for allocating respective resources on the shared spectrum channel for exclusive use by the respective network operator based on the respective priority, wherein the network operators having higher priorities are allocated a same amount or more of the resources on the shared spectrum channel for exclusive use thereof than the network operators having lower priorities, wherein the means for allocating respective resources on the shared spectrum channel further comprises:

if the number of the network operators is less than or equal to a first threshold number, for each of the network operators, means for reserving a respective first set of resources within a first duration of time for exclusive use by the respective network operator; and if the number of the network operators is greater than the first threshold number, for each of the network operators within a first set of the network operators:

means for reserving a respective second set of resources within a second duration of time for exclusive use by the respective network operator, wherein the second duration of time is greater than the first duration of time; or means for reserving a third set of resources within the first duration of time or the second duration of time for non-exclusive use by the first set of the network operators; and means for allocating additional resources on the shared spectrum channel for non-exclusive use by the network operators.

21. The apparatus of claim 20, further comprising:

if the number of the network operators is greater than the first threshold number, for each of the network operators within a second set of the network operators, means for reserving the respective first set of resources within the first duration of time for exclusive use by the respective network operator.

22. The apparatus of claim 21, wherein each of the network operators within the second set of the network operators has a higher priority than each of the network operators within the first set of the network operators.

23. The apparatus of claim 20, wherein the first set of the network operators comprises all of the network operators when reserving the respective second set of resources within the second duration of time for exclusive use by the respective network operator.

24. The apparatus of claim 20, further comprising:

if the number of the network operators is greater than the first threshold number, for each of the network operators within a second set of the network operators, means for reserving the respective first set of resources within the first duration of time for exclusive use by the respective network operator; and if the number of the network operators is greater than both the first threshold number and a second threshold number that exceeds the first threshold number, means for reserving the third set of resources within the first duration of time or the second duration of time for non-exclusive use by the first set of the network operators based on the respective priority of the network operators within the first set of the network operators.

25. The apparatus of claim 24, wherein each of the network operators within the first set of network operators has a lower priority than each of the network operators within the second set of network operators.

26. The apparatus of claim 20, further comprising:

if the number of the network operators is greater than the first threshold number, for each of the network operators within a second set of the network operators, means for reserving the respective first set of resources within the first duration of time for exclusive use by the respective network operator;

if the number of the network operators is greater than the first threshold number, for each of the network operators within the first set of the network operators, means for reserving the respective second set of resources within the second duration of time for exclusive use by the respective network operator; and if the number of the network operators is further greater than a second threshold number that exceeds the first threshold number, means for reserving the third set of resources within the first duration of time or the second duration of time for non-exclusive use by a third set of the network operators;

wherein each of the network operators within the first set of network operators has a lower priority than each of the network operators within the second set of network operators and each of the network operators within the third set of network operators has a lower priority than each of the network operators within the first set of network operators.

27. The apparatus of claim 20, wherein the first duration of time comprises a superframe period and the second duration of time comprises two or more superframe periods.

* * * * *